March 19, 1963   J. E. HECKETHORN   3,081,587
PRESSURIZING SHOCK ABSORBERS
Filed March 28, 1960
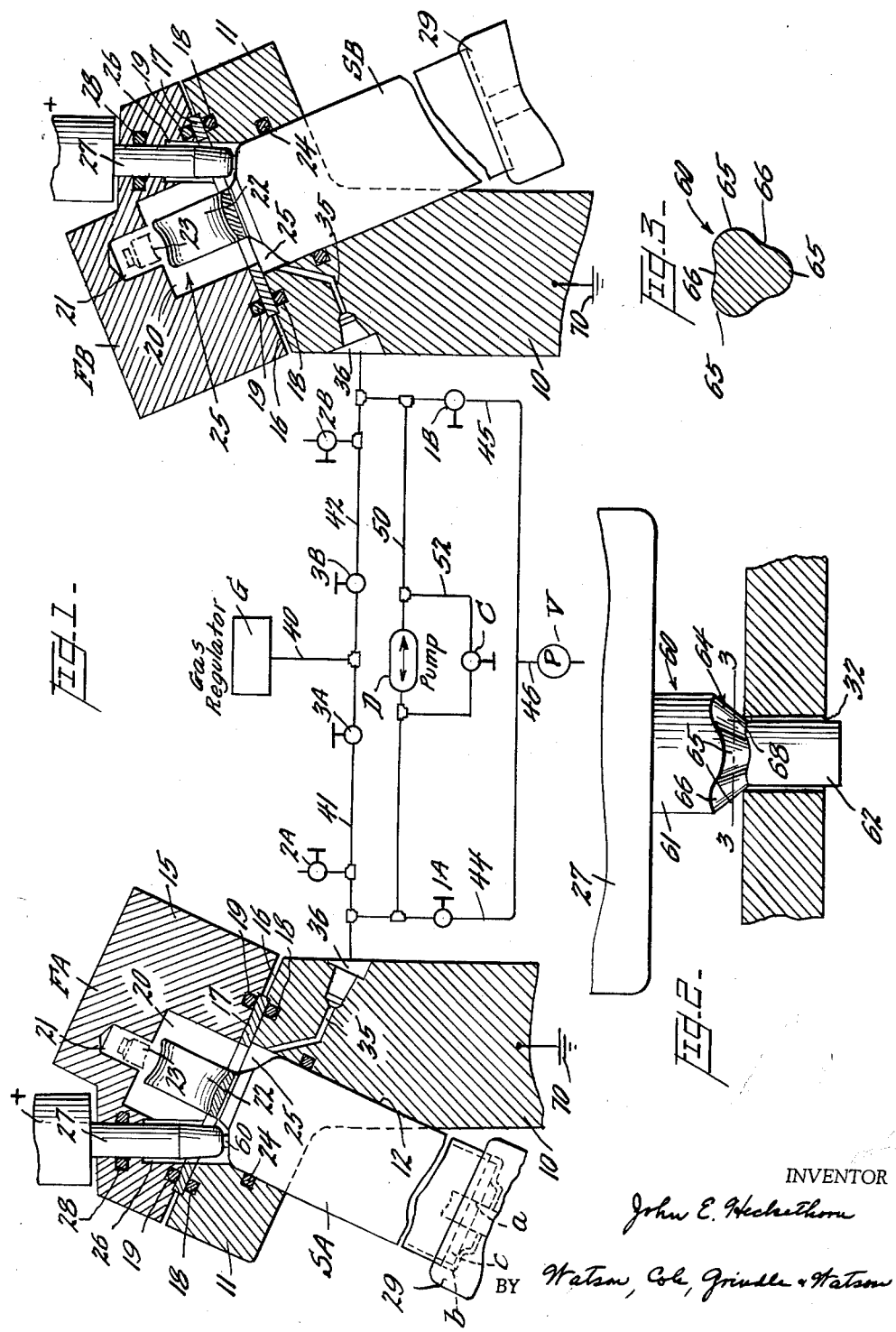
INVENTOR
John E. Heckethorn
BY Watson, Cole, Grindle & Watson
ATTORNEYS

United States Patent Office 3,081,587
Patented Mar. 19, 1963

3,081,587
PRESSURIZING SHOCK ABSORBERS
John E. Heckethorn, Dyersburg, Tenn., assignor, by mesne assignments, to Christian Marie Lucien Louis Bouraer de Carbon, Neuilly-sur-Seine, France
Filed Mar. 28, 1960, Ser. No. 17,961
9 Claims. (Cl. 53—8)

This invention relates to the pressurizing of metal containers, and more particularly to methods and apparatus for injecting gas under pressure into metal cylinders or the like through a restricted opening and expeditiously sealing off the opening as soon as the pressure in the cylinder has reached the desired degree.

The invention has an especial applicability to the pressurizing of hydro-pneumatic shock absorbers for motor vehicles and the like, and has for its general object the provision of novel and improved methods and apparatus for applying an inert gas under high pressure to the upper portion of the working chamber of a direct acting shock absorber above the level of the damping liquid, the body of gas under pressure performing among others the functions of the usual anti-cavitation chamber and associated valving. These features, as well known in the art, serve to accommodate the displacement of liquid damping fluid from the working chamber proper which is caused by the intermittent entrance of the piston rod to various degrees depending on the nature of the roadway over which the vehicle is travelling, and serve at the same time to lend some degree of control to the ride.

Previous efforts to facilitate the introduction of pneumatic pressure fluid into the cylinders of shock absorbers of this type have centered around the injection of the gas into the open bottom ends of the cylinders prior to the insertion of partitions, pistons, rod packings or other cooperating parts. These procedures result in the entrapment of moisture-laden air in the pressure chamber and are slow and costly to pursue.

It is proposed, in the novel procedure provided by the present invention, to completely furnish the shock absorber cylinder with all of the internal equipment required, including the damping liquid, insert the piston, install the bottom rod seal in advance of the pressurizing; then inject a gas under high pressure through a temporary small opening which is then sealed off permanently.

The invention, in its preferred embodiments, contemplates the provision of a filling unit having at least two stations at which the shock absorbers may be positioned for sequential injection of gas and sealing off.

An end of a shock absorber cylinder having a small opening in its wall is inserted into a pocket provided in the filling machine or unit which is provided with a sealing ring or gasket affording an airtight fit. Gas is admitted to the pocket at the pressure level corresponding to the initial or basic pressure desired in the working chamber of the shock absorber, this gas filling the pocket and entering the cylinder through the small opening so that the same pressure prevails in the pocket and in the shock absorber casing. Then a plug of peculiar novel construction and configuration is welded into the opening effectively sealing it and trapping the desired quantity of gas in the chamber at the desired pressure.

The residual gas in the pocket is then removed either by venting it to the atmosphere or scavening it for use in a succeeding operation, the sealed shock absorber is removed, and another shock absorber is introduced into the pocket to repeat the operating cycle.

An evacuating step is contemplated in cases where the installation is not surrounded by a dehumidified atmosphere.

Other objects and features of novelty will be apparent from the following specification when read in connection with the accompanying drawings in which one embodiment of the invention is illustrated by way of example.

In the drawings:

FIGURE 1 is a view partly schematic and partly in vertical section of a portion of an apparatus embodying the principles of the invention and by which the novel method afforded by the invention may be realized;

FIGURE 2 is a sectional view on an enlarged scale of a portion of the apparatus showing the application of the sealing plug to the gas filling orifice; and FIGURE 3 is a transverse sectional view taken on line 3—3 of FIGURE 2.

As many filling stations as desired may be provided in the machine according to the invention, but in the diagrammatic disclosure of FIGURE 1 of the drawings only two are illustrated, together with a system or network of piping by which the evacuating and pressurizing are accomplished.

The left-hand filling station as fragmentarily shown in FIGURE 1, is designated by the reference character FA and the one on the right-hand side is given the reference lettering FB. Since the various parts of these stations or units are exactly the same but in reverse positioning, the same reference characters will be used to designate the details of the stations themselves.

A supporting frame or base 10 is provided which has an outwardly projecting ledge 11, the base member being provided with a cylindrical preferably inclined opening 12 therein into which a cylindrical direct acting shock absorber casing suggested diagrammatically at SA may be inserted.

Capping the base member 10 and capable of being tightly secured thereto is the block 15. A space 16 is provided between the metallic parts 10 and 15 for electrical insulating purposes and an insulating disc or washer 17 is clamped between the surfaces and surrounding the opening 12 in the base member 10. Suitable gas-tight packing members 18 and 19 are also provided between the two members. The upper block member is provided with a recess 20 which may have an extension 21 formed therein, the recess and extension affording means to accommodate the fastening elements used at the end of the shock absorber casing to secure it to the vehicle. For example, if the fastening member is of the eye and grommet type as suggested at 22, is accommodated in the main recess 20, whereas if the element comprises the stem type, it extends into the further recess 21 as at 23.

The opening 12 of the base member 10, the recess 20 in the block 15, and the extension 21 all comprise a chamber or pocket 25 into which the cylinder of the shock absorber SA may be readily inserted with a gastight fit as afforded by the packing 24 which may be constituted by an O-ring fitted in an annular groove as suggested in the drawings. A clamping device indicated fragmentarily at 29 serves to hold the shock absorber in place at the station. The shock absorber illustrated is one which has a piston rod $a$ which passes through an opening in the bottom of the casing $b$ and is packed by the packing discs $c$.

Branching off from the pocket is a cylindrical chamber or channel 26 into which an electrode 27 may be inserted with a gas-tight fit afforded by the packing 28. The offshoot chamber or passageway 26 is aimed at a shoulder portion of the shock absorber casing SA where a small opening is left in the construction of the shock absorber casing. Such an opening is shown in the enlarged view comprising FIGURE 2 of the drawings, the wall of the chamber SA being designated 30 and the opening 32. The tip of the electrode 27 is also indicated in FIGURE 2. The nature of the plug which is to be fused into the opening will be described presently.

Leading into the pocket 25 is a drilled passageway 35 which has a widened outer portion 36 into which piping may be fitted. The piping arrangements are shown in a purely schematic or diagrammatic form in the central portion of the figure.

Now coming to the system for controlling the flow of air and gases in the process which forms an object of the present invention, it will be seen that a source of predetermined regulatable gas under pressure is shown at G. This gas is preferably an inert gas such as nitrogen. A conduit 40 leads from the regulated gas source G and has a left-hand branch 41 leading to the duct 35 of the filling station FA and a right-hand branch 42 leading to the corresponding duct or passageway in the station FB. Conduits 44 and 45 lead from the respective pipes 41 and 42 to a pipe 46 connected to a vacuum pump V. A cross conduit 50 connects the pipes 44 and 45 and in this conduit is disposed a reversible positive-displacement gas transfer pump D. This pump is preferably such as will not permit the flow of gas therethrough unless operating. Bypassing the pump D is a conduit 52 in which is inserted the valve C.

Valve 3A serves to open and close the pipe 41 and 3B controls flow through the pipe 42. Valves 2A and 2B serve to open the pipes 41 and 42 to the atmosphere in the vicinity of the passages 35 of the filling stations. Valves 1A and 1B control the evacuation of the two stations through the pipes 44, 45 and 46 by means of the pump V.

It might be well at this time to describe the sealing plug for the orifice 32. The plug designated 60 comprises a head 61 of somewhat greater diameter than the opening 32 and a stem 62 which fits into the opening 32 with clearance. The neck portion 64 between the stem 62 and the head 60 is of the peculiar undulating surface configuration shown. This surface, while generally frusto-conical in contour, comprises the nodes 65 and the depressions 66 alternating about the periphery.

When the plug is applied to the opening the nodes 65 contact with the upper peripheral edge of the opening 32 and this prevents the closing of the orifice 32 completely, leaving spaces such as indicated at 68 in FIGURE 2 through which gaseous fluid may flow through the orifice of the opening.

The condition of the various parts prior to the resistance welding fusion of the plug into the opening, is as illustrated in FIGURE 2. Then at the proper time after pressurizing has been completed, welding current is passed through the electrode 27, and thence through the plug 60 and the wall of the shock absorber SA to the frame 10 which is grounded as at 70. It has already been described how the block 15 is insulated from the frame 10 by means of the non-conducting plate or washer 17.

The current serves effectively to melt or fuse the plug 60 into the opening 32 and leave a smoothly rounded outer periphery at the point of closure.

The sequential steps in the operation of pressurizing the shock absorbers by means of the present invention will now be described.

The invention contemplates three alternative methods, any one of which may be employed to effectively pressurize and seal the cylinders and they may be selected according to the desires of the operator or the requirements of the particular job.

The first method to be described involves a full utilization of the positive displacement pump D in order to scavenge the nitrogen or other inert gas from the pocket of the station in which a shock absorber has just been filled and sealed off.

It is to be assumed that the shock absorber SB in the unit at the right-hand side of FIGURE 1 has just been welded and that an atmosphere of nitrogen remains in the pocket 25 at that side of the machine. All of the valves are now in closed position and the pump D is idle. The first step then is to unload the shock absorber SA in the station FA and re-load the station FA with a new shock absorber. Then the valve 1A is opened and the vacuum pump V evacuates the pocket 25 of the unit FA. Then the valve 1A is closed and the pump D started to withdraw any residual nitrogen from the pocket 25 in station FB and apply it to the pocket 25 of station FA. Then the pump D is stopped and the valve 3A opened and the pocket 25 in station FA fully pressurized with nitrogen or other inert gas, this gas also passing through the opening 32 past the plug 60 into the upper chamber portion of the shock absorber SA. Then the current is passed through the electrode 27 and the plug 60 fused into the opening 32 sealing the gas in the shock absorber cylinder at the desired pressure.

Next, valve 2B is opened, placing pocket 25 in station FB in communication with the atmosphere. Then the shock absorber SB is withdrawn from the station FB and this station re-loaded with a new shock absorber and atmosphere valve 2B is closed.

Then valve 1B is opened and the air is evacuated from the pocket 25 in station FB, whereupon valve 1B is closed. Then the pump D is operated in the opposite direction to draw residual nitrogen from the pocket 25 at the left-hand station FA and supply it to the pocket 25 at the right-hand station FB. Then the pump D is stopped, valve 3B opened, and the shock absorber SB at station FB pressurized. The welding current is then passed through the electrode 27 at station FB and the plug 60 sealed into the opening 32 of the shock absorber SB. Then the valve 2A is opened to release the pocket 25 of station FA to the atmosphere whereupon the described cycle is repeated.

Another way of using the system is to eliminate the pump D, or maintain it in idle position, and employ the valve C for the purpose of scavenging the nitrogen. In this case the steps above described which involve the operation of the pump D are substituted by steps which require the opening and subsequent closing of valve C. Since a vacuum exists in one of the pockets at the time the valve C is to be opened the residual nitrogen will be at least partially scavenged from the other pocket by utilization of the pressure difference. Not as much of the nitrogen will be removed as if the pump D were employed, but the use of the valve alone may suffice for some purposes.

Now for purposes of speeding up production, the scavenging of the nitrogen might be dispensed with. Under such procedure the valve C is permanently closed and the pump D idle, or both of these elements together with the pipe line 50 might be eliminated from the system.

In the last described procedure, the following steps may be followed. It is assumed that the shock absorber SB in the right-hand station FB has just been welded. Then the shock absorber SA in station FA is removed and the station re-loaded. Valve 1A is opened and the pocket 25 of station FA evacuated. Valve 1A is then closed and valve 3A opened to pressurize the shock at station FA. Then the welding is effected at FA and the shock absorber rests for a while at that station. Next, the valve 2B is opened which admits atmosphere to the pocket of station FB. The shock absorber SB is removed from station FB and the station re-loaded. Valve 2B is closed and then valve 1B is opened to evacuate station FB. Valve 1B is then closed and valve 3B opened to effect the pressurization. Then the shock absorber SB at FB is sealed by fusing the plug and finally the atmosphere valve 2A is opened, relieving the pocket in FA so that the shock absorber may be removed.

It is understood that various changes and modifications may be made in the embodiment illustrated and described herein without departing from the scope of the invention as defined by the following claims.

Having thus described the invention, what is claimed as new and desired to be secured by Letters Patent is:

1. The continuous method of pressurizing substantially cylindrical air-tight containers; which method comprises establishing at least two pressurizing stations each having a chamber therein into which the containers may be inserted in air-tight fashion; providing small openings in the walls of the containers, inserting one of the containers in the first of said chambers, after unloading the previously pressurized container if the chamber is occupied; evacuating said chamber and consequently the container received therein; injecting gas into said first chamber and thus into the enclosed container to the desired pressure; fusing the opening in the container in said first named chamber shut; venting the second of the chambers to the atmosphere, inserting a container into the second of said chambers, evacuating the second chamber with its enclosed container, injecting gas at the desired pressure into said second chamber and the container therein, fusing the opening in the last named container in the second chamber shut; venting the first named chamber to the atmosphere, unloading and then re-loading said first named chamber with another container, and repeating the described cycle.

2. The continuous method of pressurizing substantially cylindrical air-tight containers; which method comprises establishing at least two pressurizing stations each having a chamber therein into which the containers may be inserted in an air-tight fashion; providing small openings in the walls of the containers; inserting fusible metallic plugs into said small openings with restricted clearance passages left between the walls of the plug and those of the opening; inserting one of the containers in the first of said chambers after unloading the previously pressurized container if the chamber is occupied; evacuating said chamber and consequently the container received therein; injecting gas into said first chamber and thus into the enclosed container to the desired pressure; fusing the plug into gas-tight sealing relation to said small opening in the container in said first named chamber; venting the second of the chambers to the atmosphere, inserting a container into the second of said chambers, evacuating the second chamber with its enclosed container, injecting gas at the desired pressure into said chamber and the container therein, fusing the plug into gas-tight sealing relation to the small opening in said last named container in the second chamber; venting the first named chamber to the atmosphere, unloading and then re-loading said first named chamber with another container, and repeating the described cycle.

3. The continuous method of pressurizing substantially cylindrical air-tight containers, which method comprises establishing at least two pressuring stations each having a chamber therein into which the containers may be inserted in air-tight fashion; providing small openings in the walls of the containers; inserting one of the containers in the first of said chambers after unloading the previously pressurized container if the chamber is occupied; evacuating said chamber and consequently the casing received therein; scavenging the residual gas from the second of said chambers and transferring it to the first chamber, injecting gas into said first chamber and thus into the enclosed container to the desired pressure; fusing the opening in the container in said first named chamber shut; venting the second of the chambers to the atmosphere, inserting a container into the second of said chambers; evacuating the second chamber with its contained container, scavenging the residual gas from the first of said chambers and transferring it to the second chamber; injecting gas at the desired pressure into said chamber and the container therein, fusing the opening in the last named container in the second chamber shut; venting the first named chamber to the atmosphere, unloading and then re-loading said first named chamber with another container, and repeating the described cycle.

4. The method as set forth in claim 3 in which the scavenging steps are accomplished by pumping the residual gas from one chamber to the other.

5. The method as set forth in claim 3 in which the scavenging steps are accomplished by placing the two chambers in communication with each other while vacuum conditions still remain in the chamber which has just been evacuated.

6. Apparatus for pressurizing substantially cylindrical air-tight containers; which apparatus comprises a device having at least two pocket-like chambers therein each adapted to closely accommodate in air-tight fashion one of said containers; a welding electrode projecting into each of said chambers, a source of controlled welding current connected with said electrodes; a source of gas under predetermined pressure; a vacuum pump; conduits connecting the said chambers with a source of gas and with the atmosphere, valves in said conduits for the alternative communication by said chambers with said source and the atmosphere, and with neither; conduits connecting said chambers with said vacuum pump; whereby said containers may be evacuated and pressurized, the containers sealed by fusion, and the chambers vented and unloaded during successive and alternating cycles of operation; and a cross-conduit connecting each of said chambers with the other, and means controlling flow through said cross-conduit and adapted to place one of said chambers containing gas in communication with the other which is under evacuation, whereby gas may be scavenged from one chamber to the other after fusion of the container in the former chamber.

7. Apparatus for pressurizing substantially cylindrical air-tight containers; which apparatus comprises a device having at least two pocket-like chambers therein adapted to closely accommodate in air-tight fashion one of said containers; a welding electrode projecting into each of said chambers, a source of controlled welding current connected with said electrodes; a source of gas under predetermined pressure; a vacuum pump; valved conduits connecting the said chambers with said source of gas, said vacuum pump, and the atmosphere; and a cross-conduit connecting the chambers one with another and a positive displacement reversible pump in said cross-conduit; whereby said containers may be evacuated and pressurized, the containers sealed by fusion, and the chambers vented and unloaded during successive and alternating cycles of operation, and whereby residual gas may be pumped from one chamber to the other after fusion of the container in the former chamber.

8. Apparatus for pressurizing a container having a substantially cylindrical air-tight casing and a small filling opening in the wall of said casing, which apparatus comprises a device having at least two pocket-like chambers therein adapted to closely accommodate in air-tight fashion at least the portions of said casing in which said opening occurs; a welding electrode projecting into each of said chambers, a source of controlled welding current connected with said electrodes; a source of gas under predetermined pressure; and valved conduits connecting the said chambers with said source of gas; a conduit connecting said chambers with each other, a pump in said last named conduit for transferring gas from one of said chambers to the other to scavenge residual gas for subsequent use.

9. The continuous method of pressurizing substantially cylindrical air-tight containers, which method comprises establishing at least two pressurizing stations each having a chamber therein into which the containers may be inserted in air-tight fashion; providing small openings in the walls of the containers; inserting one of the containers in the first of said chambers after unloading the previously pressurized container if the chamber is occupied; scavenging the residual gas from the second of said chambers and transferring it to the first chamber, injecting gas into said first chamber and thus into the enclosed container to the desired pressure; fusing the opening in the container in said first named chamber shut; inserting a container into the second of said chambers; scavenging the residual gas from the first of said chambers and transferring it to the second chamber;

injecting gas at the desired pressure into said chamber and the container therein, fusing the opening in the last named container in the second chamber shut; unloading and then re-loading said first named chamber with another container, and repeating the described cycle.

References Cited in the file of this patent

UNITED STATES PATENTS

| | | |
|---|---|---|
| 1,039,138 | Johnson | Sept. 24, 1912 |
| 1,790,787 | Badger | Feb. 3, 1931 |
| 2,101,156 | Payne | Dec. 7, 1937 |
| 2,435,747 | Larson | Feb. 10, 1948 |
| 2,481,042 | Tomasek et al. | Sept. 6, 1949 |
| 2,506,363 | Hohl et al. | May 2, 1950 |
| 2,685,383 | Kochner | Aug. 3, 1954 |

FOREIGN PATENTS

| | | |
|---|---|---|
| 587,863 | Great Britain | May 7, 1947 |